(12) United States Patent
Mountz et al.

(10) Patent No.: US 12,527,414 B2
(45) Date of Patent: *Jan. 20, 2026

(54) CHILD BOOSTER SEAT ASSEMBLY

(71) Applicant: Wonderland Switzerland AG, Steinhausen (CH)

(72) Inventors: Jonathan K. Mountz, Birdsboro, PA (US); Jerry S. Ingraham, Denver, PA (US); John E. Huntley, Philadelphia, PA (US); Nathanael Saint, Morgantown, PA (US)

(73) Assignee: Wonderland Switzerland AG, Steinhausen (CH)

( * ) Notice: Subject to any disclaimer, the term of this patent is extended or adjusted under 35 U.S.C. 154(b) by 187 days.

This patent is subject to a terminal disclaimer.

(21) Appl. No.: 18/234,359

(22) Filed: Aug. 15, 2023

(65) Prior Publication Data

US 2023/0380605 A1    Nov. 30, 2023

Related U.S. Application Data

(63) Continuation of application No. 17/476,486, filed on Sep. 16, 2021, now Pat. No. 11,766,138, which is a
(Continued)

(51) Int. Cl.
*A47D 1/10* (2006.01)
*A47D 1/00* (2006.01)

(52) U.S. Cl.
CPC ............ *A47D 1/103* (2013.01); *A47D 1/004* (2013.01); *A47D 1/006* (2013.01); *A47D 1/0085* (2017.05)

(58) Field of Classification Search
CPC ................................ A47D 1/006; A47D 1/004
See application file for complete search history.

(56) References Cited

U.S. PATENT DOCUMENTS

| 7,673,934 B2 | 3/2010 | Bearup |
| 8,567,867 B2 | 10/2013 | Arnold, IV |

(Continued)

FOREIGN PATENT DOCUMENTS

| CN | 101352293 A | 1/2009 |
| CN | 204995051 U | 1/2016 |

(Continued)

*Primary Examiner* — Timothy J Brindley
(74) *Attorney, Agent, or Firm* — Winston Hsu

(57) ABSTRACT

A child booster seat assembly includes a base seat, an upper seat and a latch mechanism. The upper seat is detachably installed on the base seat. A first guiding structure and a second guiding structure are formed on the upper seat and the base seat respectively and for cooperating with each other to guide the upper seat to be aligned with the base seat. The first guiding structure protrudes from a rear bottom portion of the upper seat. The latch mechanism includes an actuator movably disposed on the upper seat, a first engaging structure and a second engaging structure. The first engaging structure is movably disposed on the first guiding structure and connected to the actuator. The second engaging structure is formed inside the second guiding structure and located at a position corresponding to the first engaging structure for engaging with or disengaging from the first engaging structure.

21 Claims, 10 Drawing Sheets

Related U.S. Application Data continuation of application No. 16/869,602, filed on May 8, 2020, now Pat. No. 11,141,000.

(60) Provisional application No. 62/889,712, filed on Aug. 21, 2019, provisional application No. 62/846,142, filed on May 10, 2019.

(56) References Cited

U.S. PATENT DOCUMENTS

| | | | |
|---|---|---|---|
| 9,101,225 B2* | 8/2015 | Kostyniak | A47D 1/004 |
| 9,635,955 B2 | 5/2017 | Greger | |
| 9,986,850 B2 | 6/2018 | Haut | |
| 10,588,424 B2* | 3/2020 | Sclare | A47D 1/02 |
| 11,877,671 B2* | 1/2024 | Sclare | A47D 1/004 |
| 2007/0040420 A1 | 2/2007 | Li | |
| 2016/0174727 A1 | 6/2016 | Haut | |
| 2016/0192787 A1 | 7/2016 | Perrin | |
| 2017/0251826 A1 | 9/2017 | Sclare | |
| 2018/0279799 A1 | 10/2018 | Ingraham | |
| 2021/0037989 A1 | 2/2021 | Rogers | |

FOREIGN PATENT DOCUMENTS

| | | |
|---|---|---|
| CN | 108685393 A | 10/2018 |
| CN | 108720425 A | 11/2018 |

\* cited by examiner

CHILD BOOSTER SEAT ASSEMBLY

CROSS REFERENCE TO RELATED APPLICATIONS

This application is a continuation application of U.S. application Ser. No. 17/476,486, filed on Sep. 16, 2021, which is a continuation application of U.S. application Ser. No. 16/869,602, filed on May 8, 2020, which claims the benefit of U.S. Provisional Application No. 62/846,142, filed on May 10, 2019, and claims the benefit of U.S. Provisional Application No. 62/889,712, filed on Aug. 21, 2019. The contents of these applications are incorporated herein by reference.

BACKGROUND OF THE INVENTION

Field of the Invention

The present invention relates to a child product, and more particularly, to a child booster seat assembly which is switchable between different using modes for accommodating children of different ages and capable of providing two seating areas for two children at once.

Description of the Prior Art

With development of the economy and advancement of the technology, there are more and more consumer goods for bringing convenience in people's life. A child booster seat is one of the consumer goods. The child booster seat is installed on an adult chair to provide an elevated safe seating area for a child. However, the conventional child booster seat is not suitable for children of different ages because a growing child's height and weight increases rapidly, so that a caregiver has to replace the child booster seat when the child booster seat does not fit with a child properly, which causes a waste of money and resources. Furthermore, the conventional child booster seat cannot provide two seating areas for two children at once.

SUMMARY OF THE INVENTION

Therefore, it is an objective of the present invention to provide a child booster seat assembly which is switchable between different using modes for accommodating children of different ages and capable of providing two seating areas for two children at once, for solving the aforementioned problem.

In order to achieve the aforementioned objective, the present invention discloses a child booster seat assembly. The child booster seat assembly includes a base seat, an upper seat and a latch mechanism. A first seating area is formed on the base seat. A second seating area is formed on the upper seat. The upper seat is detachably installed on the base seat. At least one first guiding structure and at least one second guiding structure are formed on the upper seat and the base seat respectively. The at least one first guiding structure protrudes from a rear bottom portion of the upper seat. The at least one first guiding structure and the at least one second guiding structure cooperate with each other for guiding the upper seat to be aligned with the base seat when the upper seat is installed on the base seat. The latch mechanism is for latching the upper seat on the base seat and includes an actuator, at least one first engaging structure and at least one second engaging structure. The actuator is movably disposed on the upper seat. The at least one first engaging structure is movably disposed on the at least one first guiding structure and connected to the actuator. The at least one second engaging structure is formed inside the at least one second guiding structure and located at a position corresponding to the at least one first engaging structure for engaging with or disengaging from the at least one first engaging structure.

According to an embodiment of the present invention, the latch mechanism further includes a linking assembly, and the actuator is connected to the at least one first engaging structure by the linking assembly.

According to an embodiment of the present invention, the linking assembly includes at least one driving component and at least one driven component. A driving inclined slot is formed on the at least one driving component. A sliding column protrudes from the at least one driven component and passes through the driving inclined slot, and the actuator drives the at least one first engaging structure by a cooperation of the driving inclined slot and the sliding column.

According to an embodiment of the present invention, the at least one second guiding structure is located at a position corresponding to the at least one first guiding structure.

According to an embodiment of the present invention, the at least one first engaging structure and the at least one second engaging structure are engaged with each other to restrain separation of the upper seat from the base seat.

According to an embodiment of the present invention, the actuator is a button. The at least one first engaging structure is a latch. The at least one second engaging structure is an indentation. The at least one first guiding structure is a key, and the at least one second guiding structure is a keyway.

According to an embodiment of the present invention, the upper seat includes a seat bottom and a seat back pivotally disposed on the seat bottom.

According to an embodiment of the present invention, at least one pivoting boss protrudes from the seat back. At least one through slot is formed on the seat bottom, and the at least one pivoting boss rotatably passes through the at least one through slot.

According to an embodiment of the present invention, the at least one pivoting boss includes a flange. The seat bottom includes a bottom body. The at least one through slot is formed on the bottom body and extends along a vertical direction. A diameter of an upper end of the at least one through slot is greater than a diameter of a lower end of the at least one through slot. The diameter of the upper end of the at least one through slot is greater than a diameter of the flange for allowing the flange to pass through the upper end of the at least one through slot. The diameter of the lower end of the at least one through slot is less than the diameter of the flange for restraining the flange from passing through the lower end of the at least one through slot. The at least one pivoting boss rotatably engages with the lower end of the at least one through slot about a pivoting axis of the seat back relative to the seat bottom.

According to an embodiment of the present invention, the seat bottom further includes at least one side panel detachably installed on the bottom body. A retention boss protrudes from the at least one side panel for rotatably and at least partially inserting into the at least one pivoting boss, and the retention boss restrains the at least one pivoting boss from moving relative to the at least one through slot when the retention boss is rotatably and at least partially inserted into the at least one pivoting boss.

According to an embodiment of the present invention, the seat back includes an upper portion and a lower portion. The lower portion is pivotally disposed on the seat bottom, and the upper portion is detachably installed on the lower portion.

According to an embodiment of the present invention, the at least one first guiding structure is for supporting the upper seat on an adult chair when the upper seat is detached from the base seat and placed on the adult chair, and the child booster seat assembly further includes at least one webbing strap and at least one chamber structure. The at least one webbing strap is connected to the upper seat for attaching the upper seat onto the adult chair. The at least one chamber structure is located adjacent to a bottom portion of the upper seat. The at least one chamber structure includes an uncovered opening, and the at least one webbing strap is accommodated inside the at least one chamber structure through the uncovered opening.

According to an embodiment of the present invention, the upper seat includes a seat bottom. The seat bottom includes a bottom body and at least one side panel detachably installed on the bottom body, and the at least one chamber structure is integrated with the at least one side panel.

According to an embodiment of the present invention, the uncovered opening is oriented horizontally toward a center of the bottom portion of the upper seat.

According to an embodiment of the present invention, the upper seat further includes a harness system for securing a child on the upper seat.

According to an embodiment of the present invention, the child booster seat assembly further includes a tray detachably disposed on the upper seat.

According to an embodiment of the present invention, the child booster seat assembly further includes a seat cushion whereon a third seating area is formed. The seat cushion is detachably disposed on the upper seat, and the third seating area is less than the second seating area.

According to an embodiment of the present invention, the second seating area is less than the first seating area.

In order to achieve the aforementioned objective, the present invention further discloses a child booster seat assembly. The child booster seat assembly includes a base seat, an upper seat and a latch mechanism. A first seating area is formed on the base seat. A second seating area is formed on the upper seat. The upper seat is detachably installed on the base seat. At least one first guiding structure is formed on the upper seat and protruding from a rear bottom portion of the upper seat for guiding the upper seat to be aligned with the base seat when the upper seat is installed on the base seat. The latch mechanism is for latching the upper seat on the base seat and includes an actuator and at least one first engaging structure. The actuator is movably disposed on the upper seat. The at least one first engaging structure is movably disposed on the at least one first guiding structure and movable between a locking position and a releasing position. When the at least one first engaging structure is located at the locking position, the upper seat is restrained from being detached from the base seat, and when the actuator drives the at least one first engaging structure to move to the releasing position, the upper seat is allowed to be detached from the base seat.

In summary, in the present invention, the upper seat is detachably installed on the base seat, and the upper portion of the seat back is detachably installed on the lower portion of the seat back pivotally disposed on the seat bottom. Furthermore, the seat cushion and the tray are detachably disposed on the upper seat. Therefore, the child booster seat assembly is switchable between different using modes with different seating areas and different elevated heights for accommodating children of different ages. Furthermore, when the upper seat is detached from the base seat, the upper seat and the base seat can be installed on two adult chairs and used independently. Therefore, the child booster seat can accommodate two children at once.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
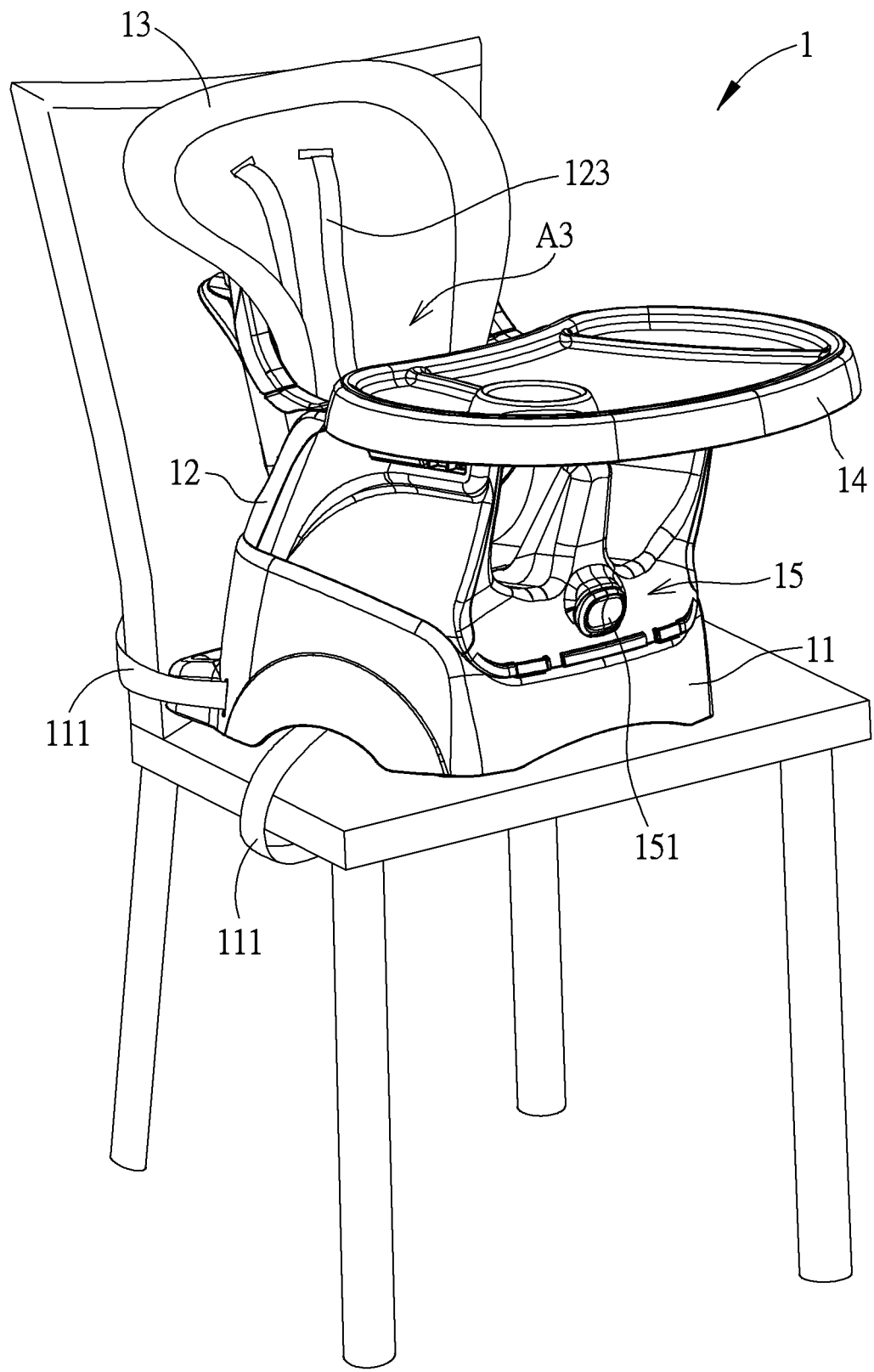
FIG. 1 to FIG. 7 are diagrams of a child booster seat assembly in different using modes according to an embodiment of the present invention.
Figure 2:
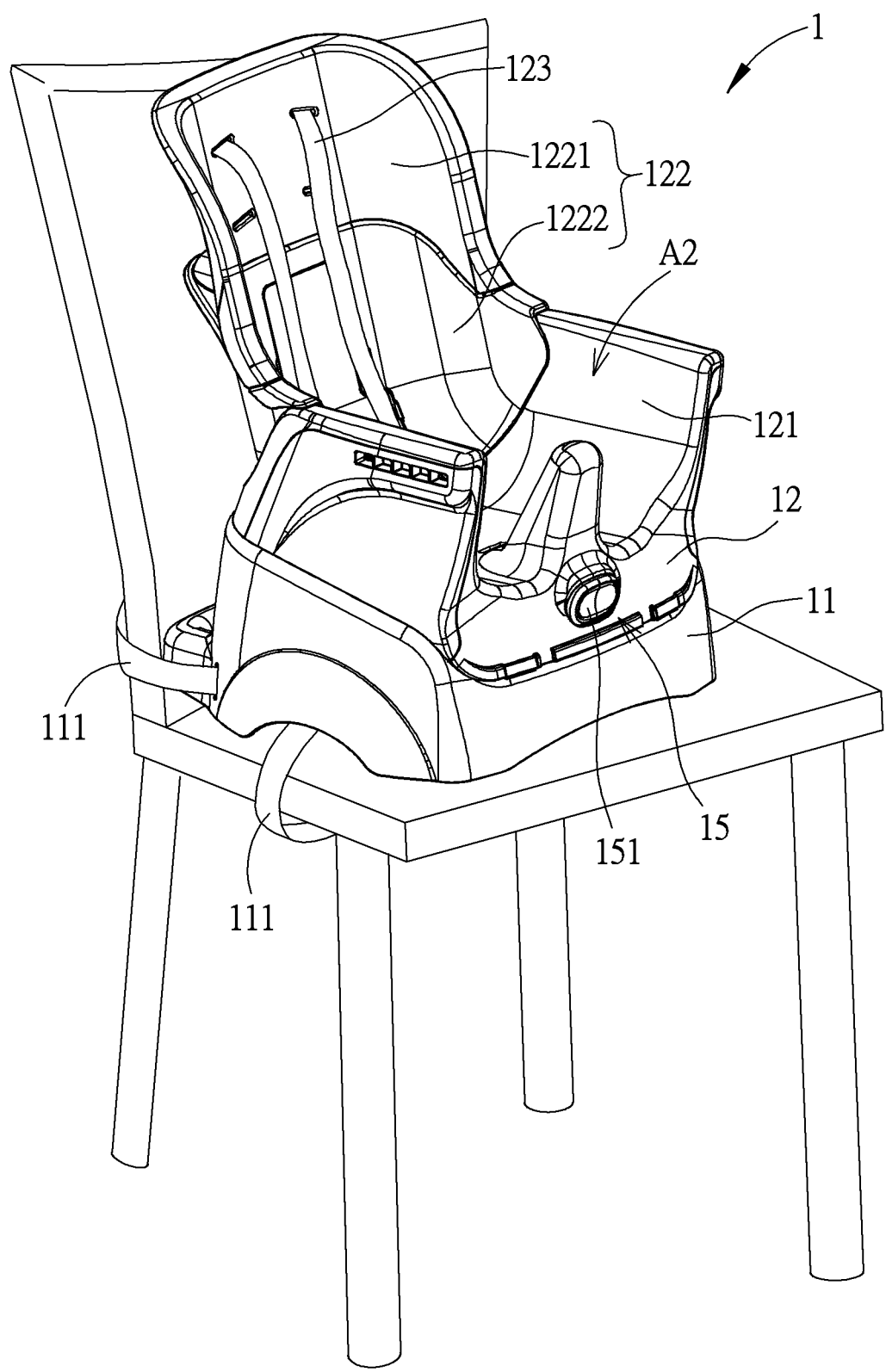
Figure 3:
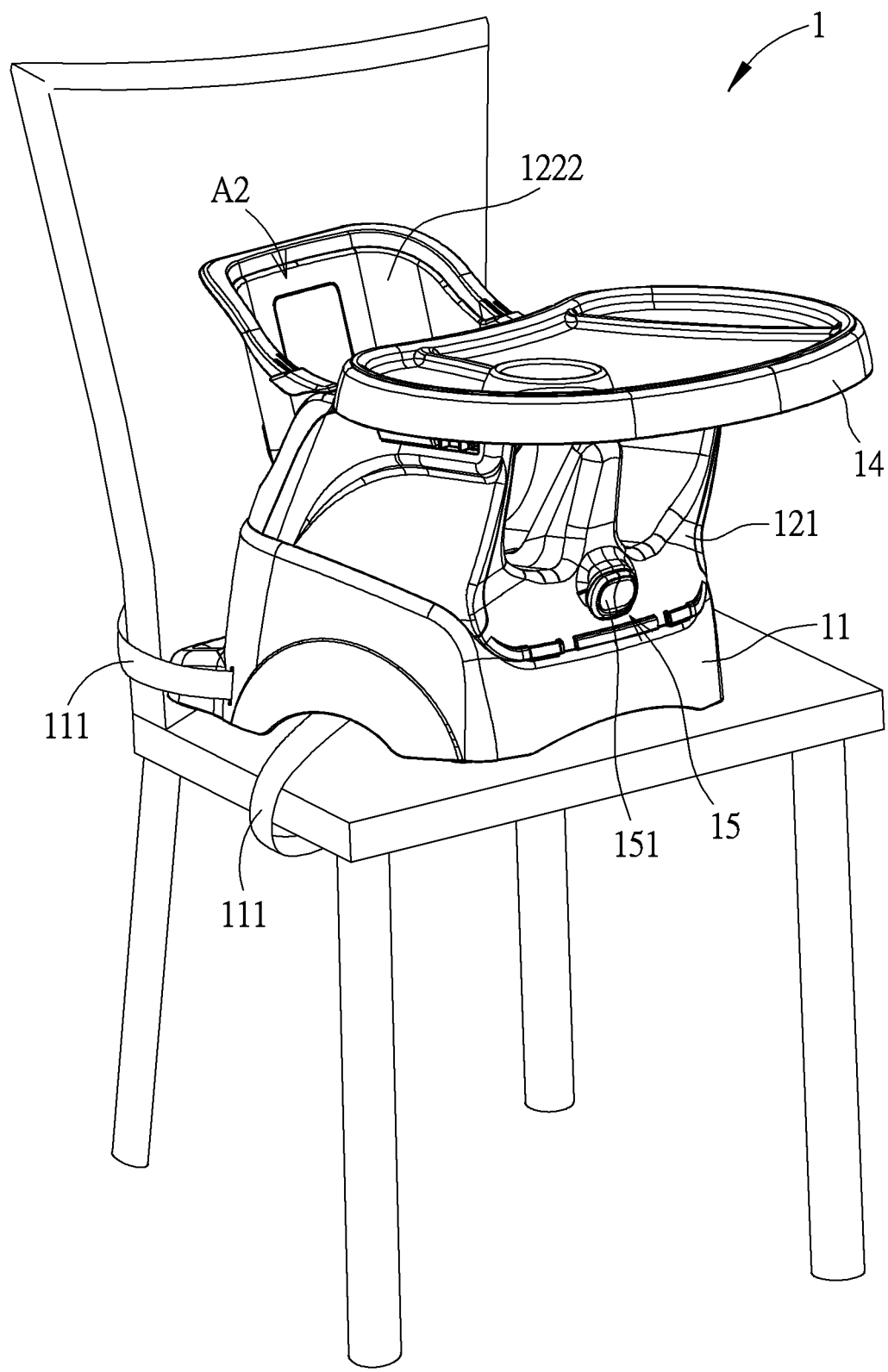
Figure 4:
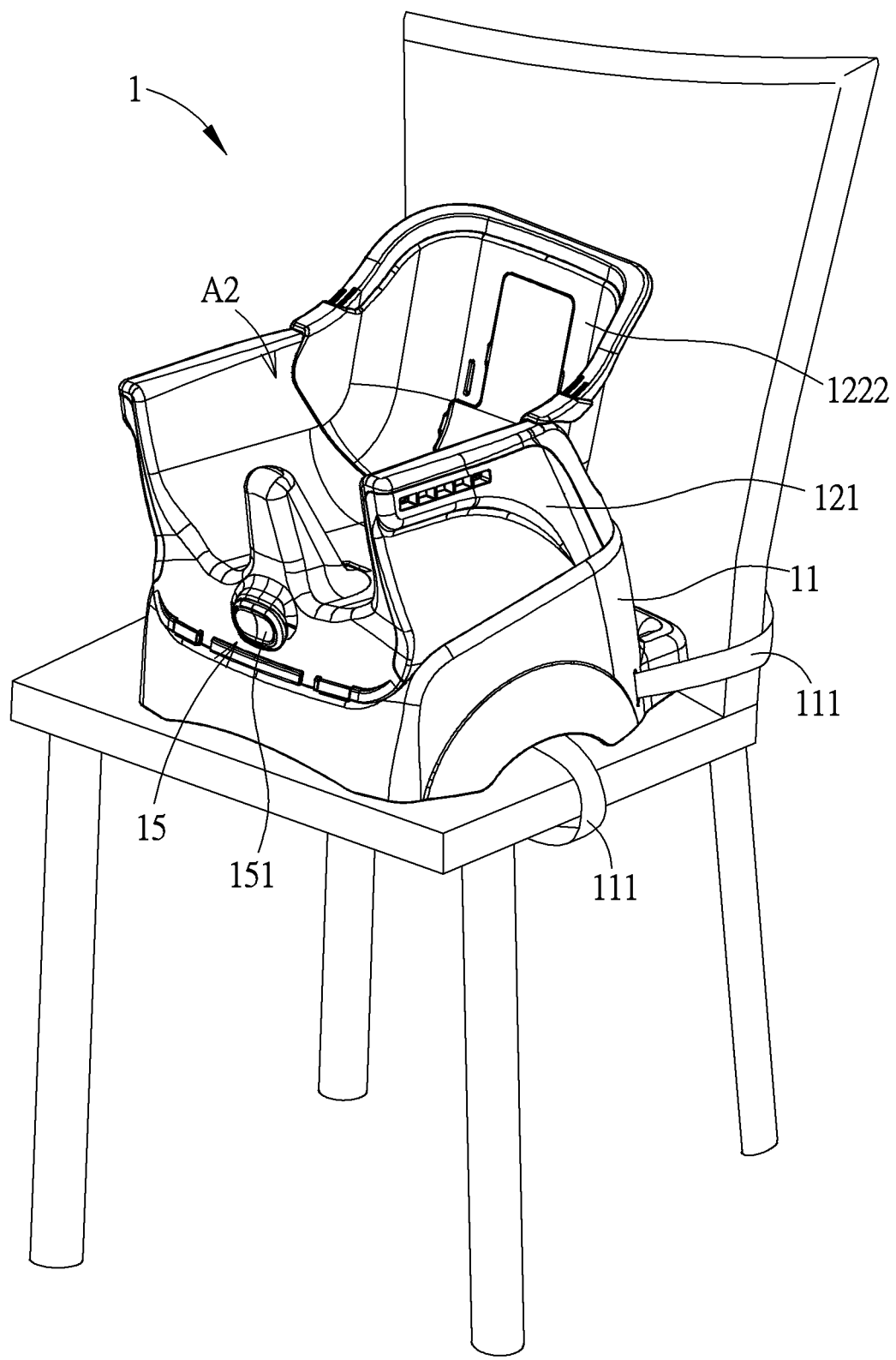

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Please refer to FIG. 1 to FIG. 7. FIG. 1 to FIG. 7 are diagrams of a child booster seat assembly 1 in different using modes according to an embodiment of the present invention. In order to illustrate structure and operational principle of the child booster seat assembly 1 of the present invention, the using states shown in FIG. 1 to FIG. 7 are only exemplary. However, the present invention is not limited thereto. As shown in FIG. 1 to FIG. 7, the child booster seat assembly 1 includes a base seat 11, an upper seat 12, a seat cushion 13 and a tray 14. The upper seat 12 is detachably installed on the base seat 11. The seat cushion 13 and the tray 14 are detachably disposed on the upper seat 12. The upper seat 12 includes a seat bottom 121, a seat back 122 and a harness system 123. The seat back 122 is pivotally disposed on the seat bottom 121 and can be reclined relative to the seat bottom 121. The seat back 122 includes an upper portion 1221 and a lower portion 1222. The upper portion 1221 can be detachably installed on the lower portion 1222 for supporting a child's back and neck. The lower portion 1222 is pivotally disposed on the seat bottom 121. The harness system 123 is detachably disposed on the upper portion 1221 of the seat back 122 for securing the child.

A first seating area A1 is formed on the base seat 11. A second seating area A2 is formed on the upper seat 12. A third seating area A3 is formed on the seat cushion 13. Preferably, in this embodiment, the second seating area A2 can be less than the first seating area A1, and the third seating area A3 can be less than the second seating area A2. In other words, in this embodiment, the third seating area A3 can be configured to accommodate an infant who can be 0 to 1 year of age, the second seating area A2 can be configured to accommodate a toddler who can be 1 to 2 year of age, and the first seating area A1 can be configured to accommodate a youth who can be over 2 year of age. For example, when the upper seat 12 is installed on the base seat 11 and the seat cushion 13 is installed on the upper seat 12, the child booster seat assembly 1 can provide the third seating area A3 to accommodate the infant. When the upper seat 12 is installed on the base seat 11 and the seat cushion 13 is detached from the upper seat 12, the child booster seat assembly 1 can provide the second seating area A2 to accommodate the toddler. When the upper seat 12 is detached from the base seat 11, the child booster seat assembly 1 can provide the first seating area A1 to accommodate the youth. However, the present invention is not limited to this embodiment. For example, in another embodiment, the first seating area formed on the base seat can be less than or equal to the second seating area formed on the upper seat.

Figure 5:
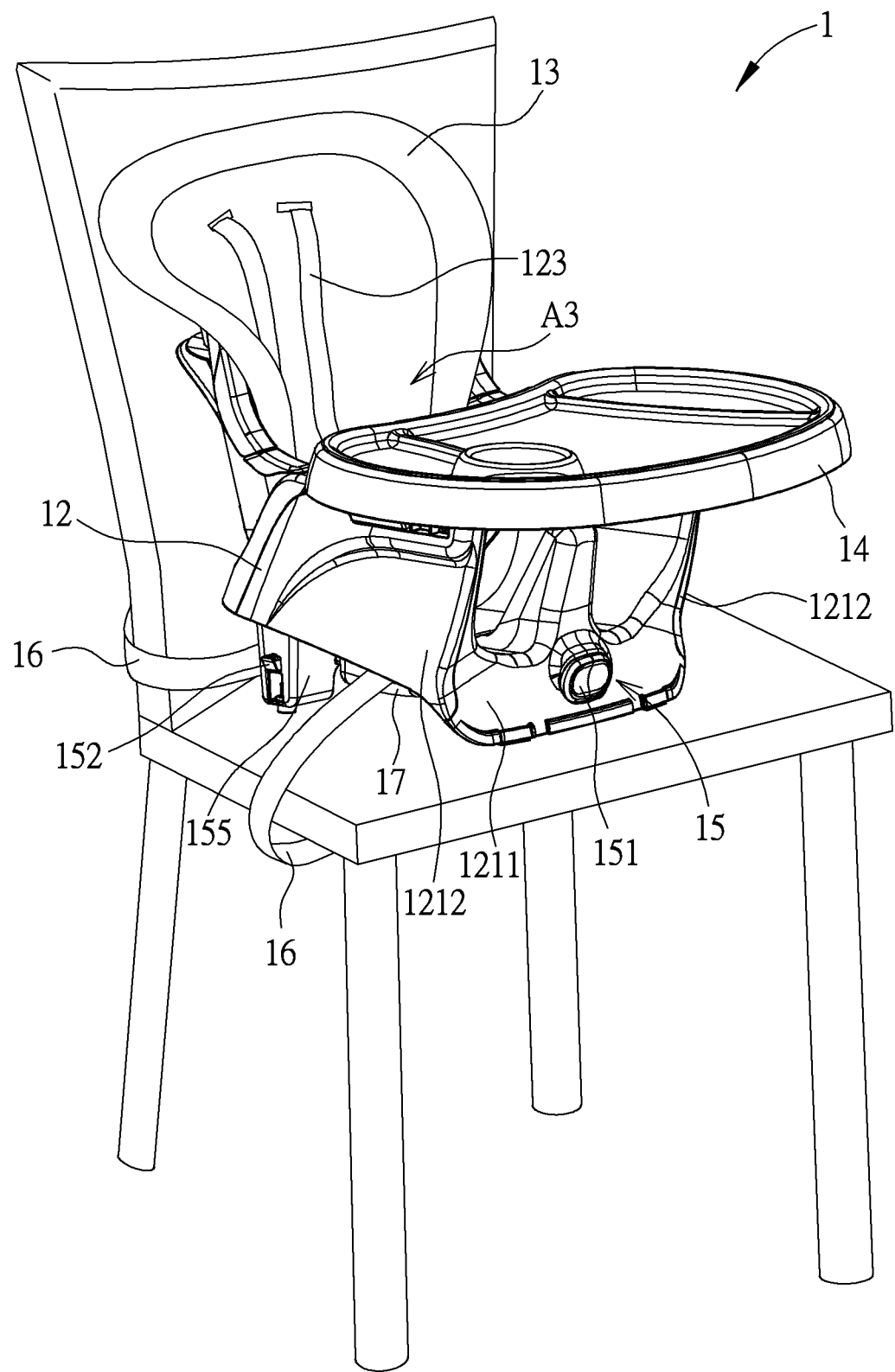
Figure 6:
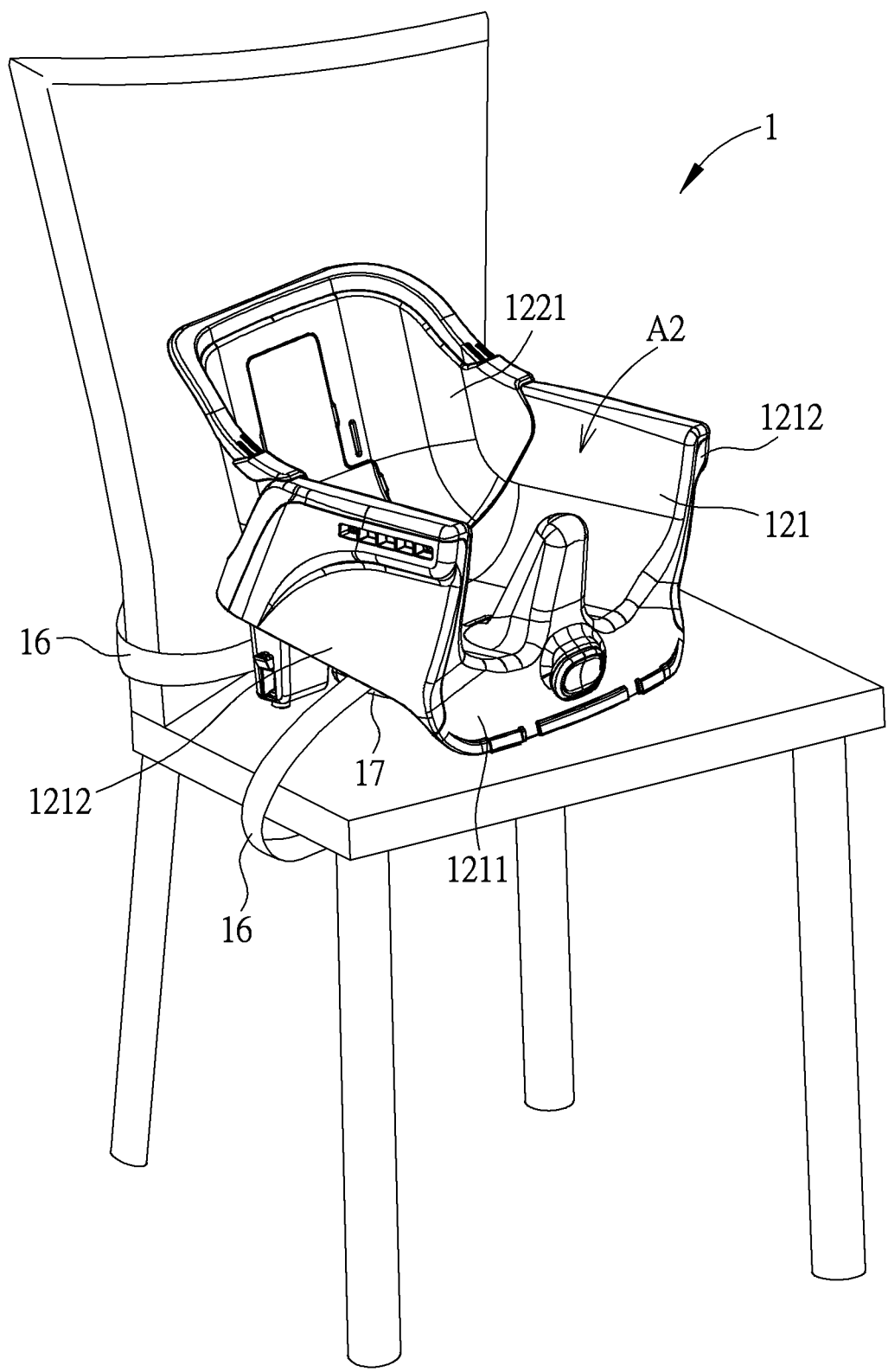
Figure 7:
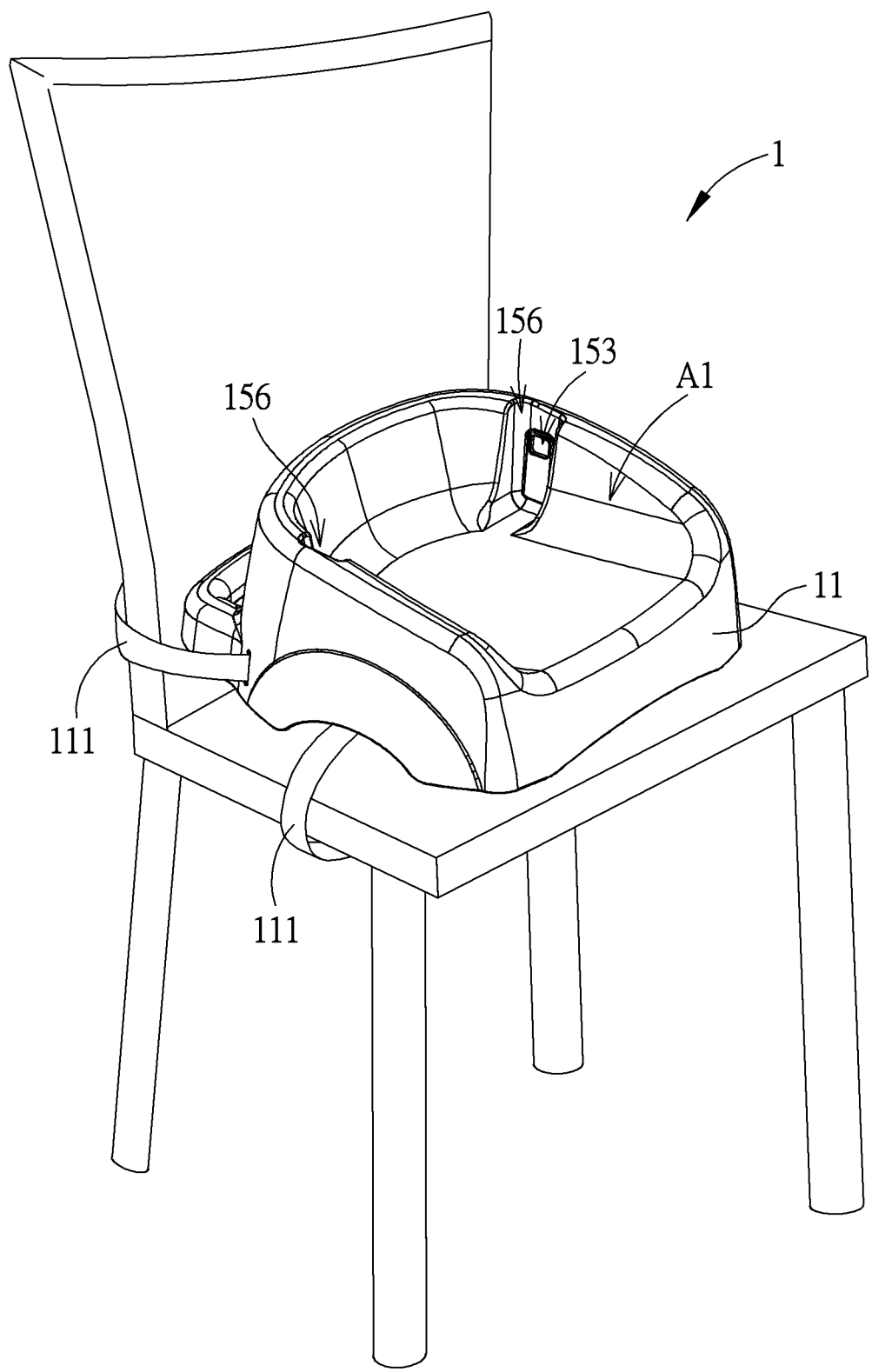

When the child booster seat assembly 1 is in the using modes as shown in FIG. 1 to FIG. 4, the upper seat 12 is installed on the base seat 11 and the base seat 11 is fastened on an adult chair by at least one strap 111 connected to the base seat 11, so that the upper seat 12 is located at a higher position. When the child booster seat assembly 1 is in the using modes as shown in FIG. 5 to FIG. 6, the upper seat 12 is detached from the base seat 11 and installed on the adult chair directly by at least one webbing strap 16 connected to the upper seat 12, so that the upper seat 12 is located at a lower position. When the child booster seat assembly 1 is in the using mode as shown in FIG. 7, the upper seat 12 is detached from the base seat 11, and the base seat 11 is installed on the adult chair by the at least one strap 111. Furthermore, when the upper seat 12 is detached from the base seat 11 and installed on the adult chair as shown in FIG. 5 to FIG. 6, the base seat 11 can be installed on another adult chair as shown in FIG. 7, so that the upper seat 12 and the base seat 11 can be used independently to accommodate two children at once. Besides, as shown in FIG. 1 to FIG. 6, understandably, no matter when the upper seat 12 is installed on the base seat 11 or the adult chair, the upper portion 1221 of the seat back 122 can be selectively installed on the lower portion 1222 of the seat back 122, the seat cushion 13 can be selectively installed on the upper seat 12, the tray 14 can be selectively installed on the upper seat 12 and the harness system 123 can be selectively installed on the upper portion 1221 of the seat back 122. Such configuration provides flexibility in use.

Figure 8:
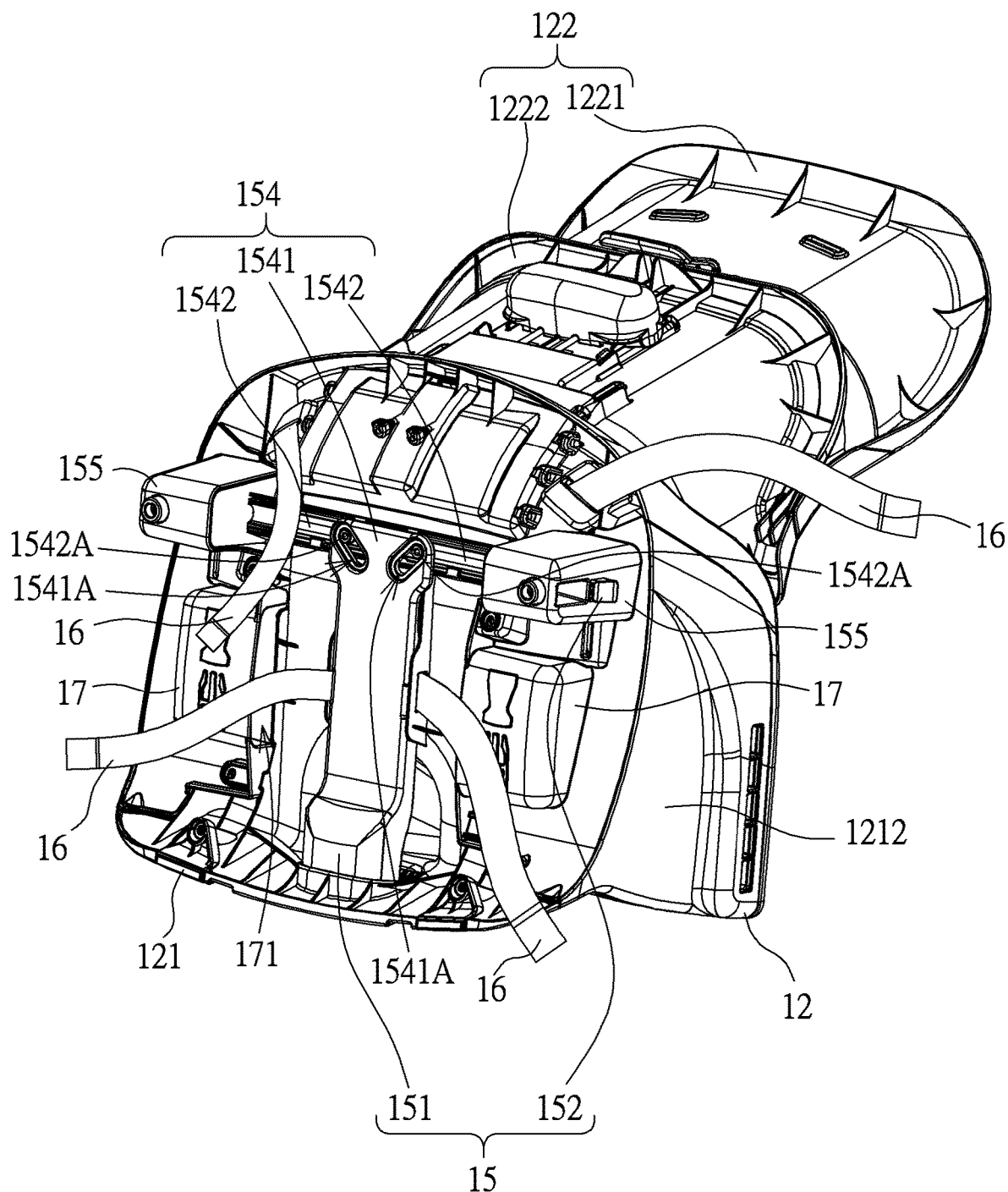
FIG. 8 is a diagram of a bottom portion of an upper seat according to the embodiment of the present invention.

Please refer to FIG. 1 to FIG. 8. FIG. 8 is a diagram of a bottom portion of the upper seat 12 according to the embodiment of the present invention. As shown in FIG. 1 to FIG. 8, the child booster seat assembly 1 further includes a latch mechanism 15 for latching the upper seat 12 on the base seat 11. The latch mechanism 15 includes an actuator 151, two first engaging structures 152 and two second engaging structures 153. The actuator 151 is disposed on the upper seat 12. The two first engaging structures 152 are disposed on the upper seat 12 and connected to the actuator 151. The two second engaging structures 153 are disposed on the base seat 11 and located at positions corresponding to the two first engaging structures 152 for engaging with or disengaging from the two first engaging structures 152. The upper seat 12 is restrained from being separated from the base seat 11 when the two first engaging structures 152 respectively engage with the two second engaging structures 153. The upper seat 12 is allowed to be separated from the base seat 11 when the two first engaging structures 152 respectively disengage from the two second engaging structures 153.

Specifically, the actuator 151 is movably disposed on the upper seat 12 and connected to the two first engaging structures 152 by a linking assembly 154. The linking assembly 154 includes a driving component 1541 connected to the actuator 151 and two driven components 1542 respectively connected to the two first engaging structures 152. Two driving inclined slots 1541A are formed on the driving component 1541. A sliding column 1542A protrudes from each driven component 1542 and passes through the corresponding driving inclined slot 1541A. The actuator 151 can drive the two first engaging structures 152 by cooperation of the two driving inclined slots 1541A and the two sliding columns 1542A. It should be understood that the numbers of the driving component and the driven component can be determined according to the number of the first engaging structure. Furthermore, two first guiding structures 155 are formed on the upper seat 12. Two second guiding structures 156 are formed on the base seat 11 and located at positions corresponding to the two first guiding structures 155. The upper seat 12 is guided to be aligned with the base seat 11 by cooperation of the two first guiding structures 155 and the two second guiding structures 156. Each first engaging structure 152 is movably disposed on the corresponding first guiding structure 155. Each second engaging structure 153 is formed inside the corresponding second guiding structure 156. Each first engaging structure 152 and the corresponding second engaging structure 153 are engaged with each other to restrain separation of the upper seat 12 from the base seat 11.

Preferably, in this embodiment, the actuator 151 can be a button, each first engaging structure 152 can be a latch, each second engaging structure can be an indentation, each first guiding structure 155 can be a key, and each second guiding structure 156 can be a keyway. However, the present invention is not limited to this embodiment.

Please refer to FIG. 5, FIG. 6 and FIG. 8. As shown in FIG. 5, FIG. 6 and FIG. 8, the child booster seat assembly 1 further includes four webbing straps 16 and two chamber structures 17. The four webbing straps 16 are connected to the upper seat 12. Two of the four webbing straps 16 can wrap around a seat back of the adult chair to be connected to each other, and the other two of the four webbing straps 16 can wrap around a seat pan of the adult chair to be connected to each other, so as to fasten the upper seat 12 on the adult chair. When the upper seat 12 is fastened on the adult chair, the two first guiding structures 155 can be used as two stands to support the upper seat 12 on the adult chair. The two chamber structures 17 are located adjacent to the bottom portion of the upper seat 12. Each chamber structure 17 includes an uncovered opening 171, and each webbing strap 16 can be accommodated inside the corresponding chamber structure 17 through the uncovered opening 171. Specifically, the seat bottom 121 includes a bottom body 1211 and two side panels 1212 detachably installed on the bottom body 1211. Each chamber structure 17 can be integrated with the corresponding side panel 1212, and the uncovered opening 171 is oriented horizontally toward a center of the bottom portion of the upper seat 12, i.e., the two uncovered opening 171 face toward each other. Such configuration allows a caregiver to store the four webbing strap 16 in the two chamber structures 17 easily for preventing interference caused by the loose webbing strap 16 when the upper seat 12 is installed on the base seat 11.

Figure 9:
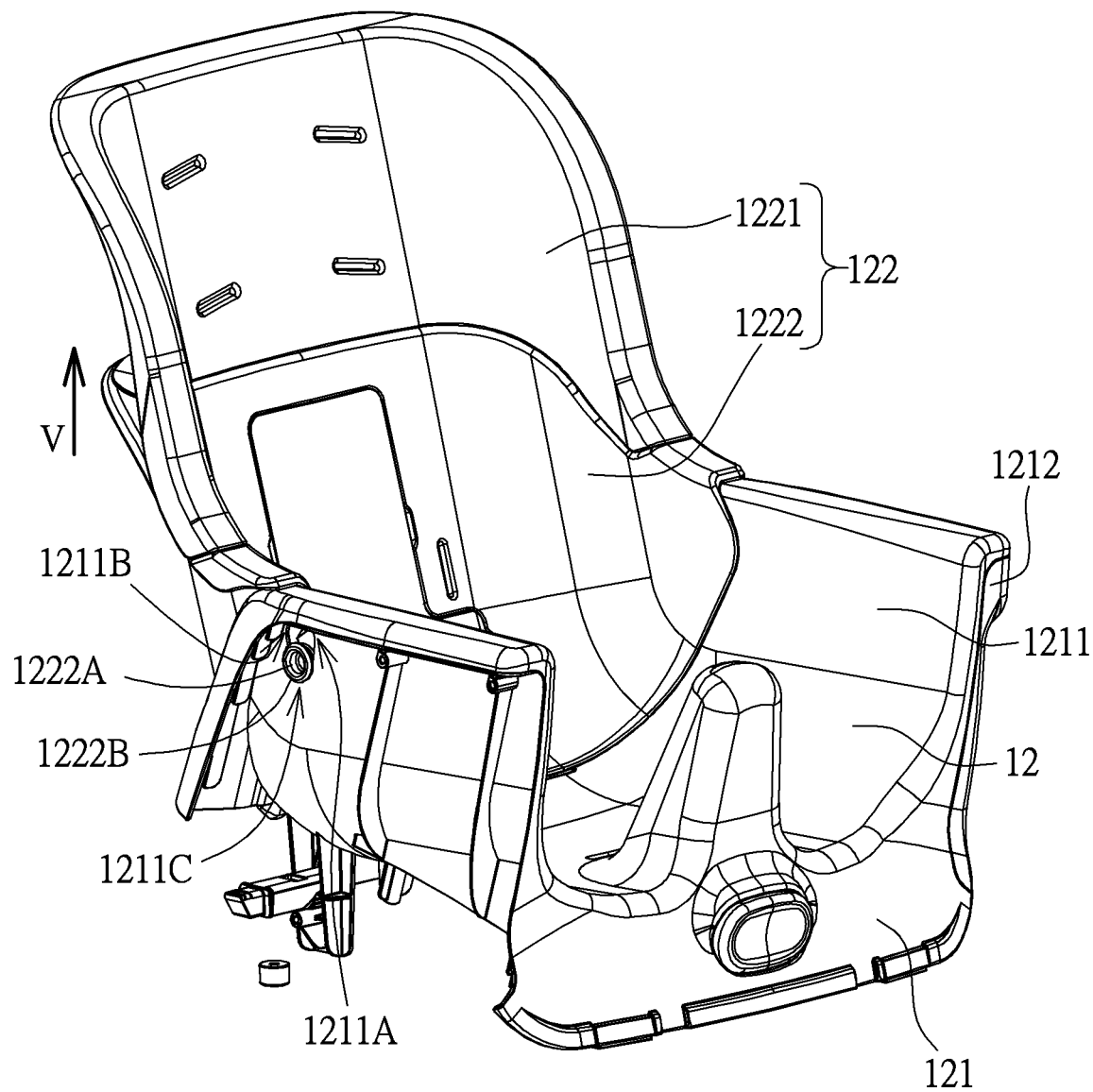
FIG. 9 is a partial diagram of the upper seat according to the embodiment of the present invention.
Figure 10:
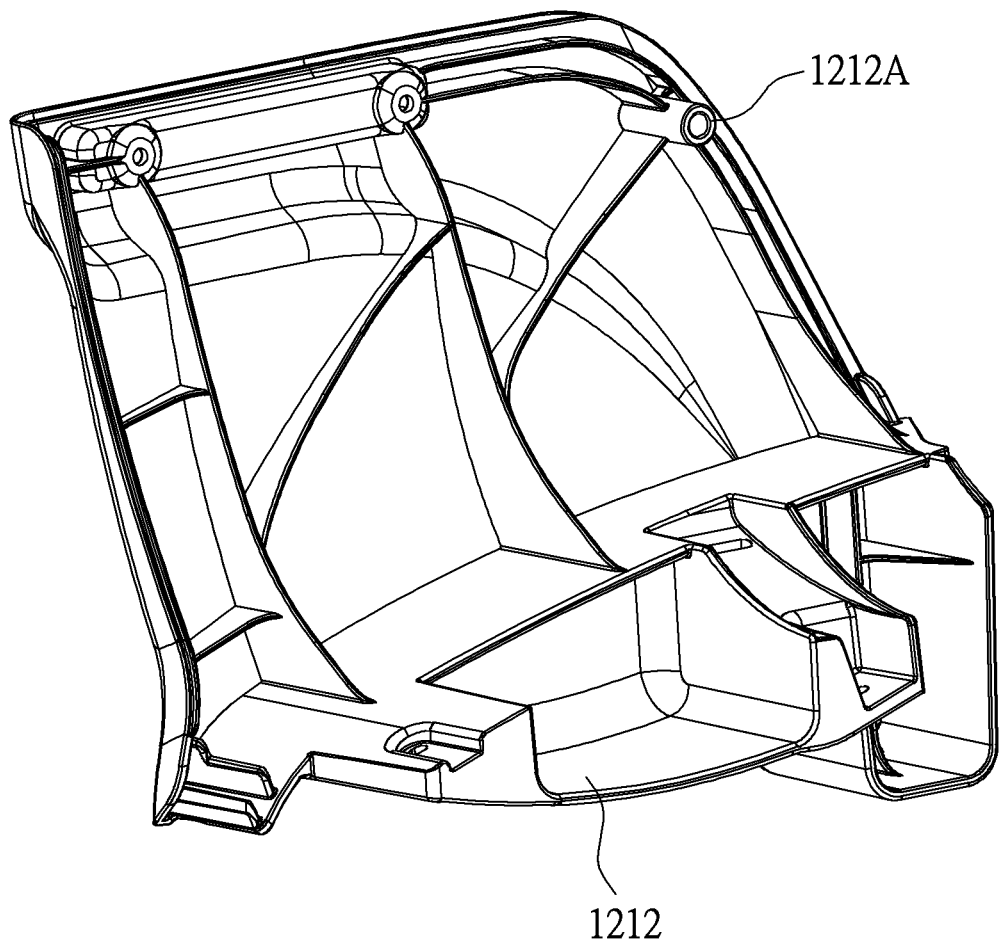
FIG. 10 is a diagram of a side panel according to the embodiment of the present invention.

Besides, please refer to FIG. 5 to FIG. 10. FIG. 9 is a partial diagram of the upper seat 12 according to the embodiment of the present invention. FIG. 10 is a diagram of the side panel 1212 according to the embodiment of the present invention. As shown in FIG. 5 to FIG. 10, a pivoting boss 1222A protrudes from each lateral side of the lower portion 1222 of the seat back 122. A through slot 1211A is formed on each lateral side of the bottom body 1211 of the seat bottom 121. Each pivoting boss 1222A rotatably passes through the corresponding through slot 1211A and includes a flange 1222B. Each through slot 1211A extends along a vertical direction V. A diameter of an upper end 1211B of each through slot 1211A is greater than a diameter of a lower end 1211C of each through slot 1211A. The diameter of the upper end 1211B of each through slot 1211A is greater than a diameter of the flange 1222B of the corresponding pivoting boss 1222A for allowing the corresponding flange 1222B to pass through the upper end 1211B of the corresponding through slot 1211A. The diameter of the lower end 1211C of each through slot 1211A is less than the diameter of the corresponding flange 1222B for restraining the corresponding flange 1222B from passing through the lower end 1211C of the corresponding through slot 1211A. Each pivoting boss 1222A rotatably engages with the lower end 1211C of the corresponding through slot 1211A about a pivoting axis of the seat back 122 relative to the seat bottom 121. A retention boss 1212A protrudes from each side panel 1212 for rotatably and at least partially inserting into the corresponding pivoting boss 1222A, and the corresponding retention boss 1212A restrains the corresponding pivoting boss 1222A from moving relative to the corresponding through slot 1211A when the corresponding retention boss 1212A is rotatably and at least partially inserted into the corresponding pivoting boss 1222A. Such configuration secures a pivoting connection of the seat back 122 and the seat bottom 121.

In contrast to the prior art, in the present invention, the upper seat is detachably installed on the base seat, and the upper portion of the seat back is detachably installed on the lower portion of the seat back pivotally disposed on the seat bottom. Furthermore, the seat cushion and the tray are detachably disposed on the upper seat. Therefore, the child booster seat assembly is switchable between different using modes with different seating areas and different elevated heights for accommodating children of different ages. Furthermore, when the upper seat is detached from the base seat, the upper seat and the base seat can be installed on two adult chairs and used independently. Therefore, the child booster seat can accommodate two children at once.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child booster seat assembly comprising:
    a base seat whereon a first seating area is formed;
    an upper seat whereon a second seating area is formed, the upper seat being detachably installed on the base seat, at least one first guiding structure and at least one second guiding structure being formed on the upper seat and the base seat respectively, the at least one first guiding structure protruding from a rear bottom portion of the upper seat, the at least one first guiding structure being configured to insert into the at least one second guiding structure for guiding the upper seat to be aligned with the base seat when the upper seat is installed on the base seat; and
    a latch mechanism for latching the upper seat on the base seat and comprising:
        an actuator movably disposed on the upper seat;
        at least one first engaging structure movably disposed on the at least one first guiding structure and connected to the actuator; and
        at least one second engaging structure formed inside the at least one second guiding structure and located at a position corresponding to the at least one first engaging structure for engaging with or disengaging from the at least one first engaging structure.

2. The child booster seat assembly of claim 1, wherein the latch mechanism further comprises a linking assembly, and the actuator is connected to the at least one first engaging structure by the linking assembly.

3. The child booster seat assembly of claim 2, wherein the linking assembly comprises at least one driving component and at least one driven component, a driving inclined slot is formed on the at least one driving component, a sliding column protrudes from the at least one driven component and passes through the driving inclined slot, and the actuator drives the at least one first engaging structure by a cooperation of the driving inclined slot and the sliding column.

4. The child booster seat assembly of claim 1, wherein the at least one second guiding structure is located at a position corresponding to the at least one first guiding structure.

5. The child booster seat assembly of claim 1, wherein the at least one first engaging structure and the at least one second engaging structure are engaged with each other to restrain separation of the upper seat from the base seat.

6. The child booster seat assembly of claim 1, wherein the actuator is a button, the at least one first engaging structure is a latch, the at least one second engaging structure is an indentation, the at least one first guiding structure is a key, and the at least one second guiding structure is a keyway.

7. The child booster seat assembly of claim 1, wherein the upper seat comprises a seat bottom and a seat back pivotally disposed on the seat bottom.

8. The child booster seat assembly of claim 7, wherein at least one pivoting boss protrudes from the seat back, at least one through slot is formed on the seat bottom, and the at least one pivoting boss rotatably passes through the at least one through slot.

9. The child booster seat assembly of claim 8, wherein the at least one pivoting boss comprises a flange, the seat bottom comprises a bottom body, the at least one through slot is formed on the bottom body and extends along a vertical direction, a diameter of an upper end of the at least one through slot is greater than a diameter of a lower end of the at least one through slot, the diameter of the upper end of the at least one through slot is greater than a diameter of the flange for allowing the flange to pass through the upper end of the at least one through slot, the diameter of the lower end of the at least one through slot is less than the diameter of the flange for restraining the flange from passing through the lower end of the at least one through slot, the at least one pivoting boss rotatably engages with the lower end of the at least one through slot about a pivoting axis of the seat back relative to the seat bottom.

10. The child booster seat assembly of claim 9, wherein the seat bottom further comprises at least one side panel detachably installed on the bottom body, a retention boss protrudes from the at least one side panel for rotatably and at least partially inserting into the at least one pivoting boss, and the retention boss restrains the at least one pivoting boss from moving relative to the at least one through slot when the retention boss is rotatably and at least partially inserted into the at least one pivoting boss.

11. The child booster seat assembly of claim 7, wherein the seat back comprises an upper portion and a lower portion, the lower portion is pivotally disposed on the seat bottom, and the upper portion is detachably installed on the lower portion.

12. The child booster seat assembly of claim 1, wherein the at least one first guiding structure is for supporting the upper seat on an adult chair when the upper seat is detached from the base seat and placed on the adult chair, and the child booster seat assembly further comprises:
at least one webbing strap connected to the upper seat for attaching the upper seat onto the adult chair; and
at least one chamber structure located adjacent to a bottom portion of the upper seat, the at least one chamber structure comprising an uncovered opening, and the at least one webbing strap being accommodated inside the at least one chamber structure through the uncovered opening.

13. The child booster seat assembly of claim 12, wherein the upper seat comprises a seat bottom, the seat bottom comprises a bottom body and at least one side panel detachably installed on the bottom body, and the at least one chamber structure is integrated with the at least one side panel.

14. The child booster seat assembly of claim 12, wherein the uncovered opening is oriented horizontally toward a center of the bottom portion of the upper seat.

15. The child booster seat assembly of claim 1, wherein the upper seat further comprises a harness system for securing a child on the upper seat.

16. The child booster seat assembly of claim 1, further comprising a tray detachably disposed on the upper seat.

17. The child booster seat assembly of claim 1, further comprising a seat cushion whereon a third seating area is formed, the seat cushion being detachably disposed on the upper seat, and the third seating area being less than the second seating area.

18. The child booster seat assembly of claim 1, wherein the second seating area is less than the first seating area.

19. A child booster seat assembly comprising:
a base seat whereon a first seating area is formed;
an upper seat whereon a second seating area is formed, the upper seat being detachably installed on the base seat, at least one first guiding structure being formed on the upper seat, and the at least one first guiding structure protruding from a rear bottom portion of the upper seat and extending vertically for guiding the upper seat to be aligned with the base seat when the upper seat is installed on the base seat; and
a latch mechanism for latching the upper seat on the base seat and comprising:
an actuator movably disposed on the upper seat; and
at least one first engaging structure movably disposed on the at least one first guiding structure and movable between a locking position and a releasing position, when the at least one first engaging structure is located at the locking position, the upper seat being restrained from being detached from the base seat, and when the actuator drives the at least one first engaging structure to move to the releasing position, the upper seat being allowed to be detached from the base seat.

20. The child booster seat assembly of claim 1, wherein the at least one first guiding structure and the at least one second guiding structure extend vertically.

21. A child booster seat assembly comprising:
a base seat whereon a first seating area is formed;
an upper seat whereon a second seating area is formed, the upper seat being detachably installed on the base seat, at least one first guiding structure and at least one second guiding structure being formed on the upper seat and the base seat respectively, the at least one first guiding structure protruding from a rear bottom portion of the upper seat, the at least one first guiding structure and the at least one second guiding structure cooperating with each other for guiding the upper seat to be aligned with the base seat when the upper seat is installed on the base seat, the upper seat comprising a seat bottom and a seat back, the seat back comprising an upper portion and a lower portion, the lower portion being pivotally disposed on the seat bottom, and the upper portion being detachably installed on the lower portion; and
a latch mechanism for latching the upper seat on the base seat and comprising:
an actuator movably disposed on the upper seat;
at least one first engaging structure movably disposed on the at least one first guiding structure and connected to the actuator; and
at least one second engaging structure formed inside the at least one second guiding structure and located at a position corresponding to the at least one first engaging structure for engaging with or disengaging from the at least one first engaging structure.

* * * * *